3,538,289
APPARATUS FOR AND METHOD OF
ELECTRO-EROSION MACHINING
Ronald G. Burnet and Robert L. Simpkins, Detroit, Mich., assignors to Minimation, Inc., Detroit, Mich., a corporation of Michigan
Filed June 22, 1964, Ser. No. 377,019
Int. Cl. B23p 1/08
U.S. Cl. 219—69                    14 Claims

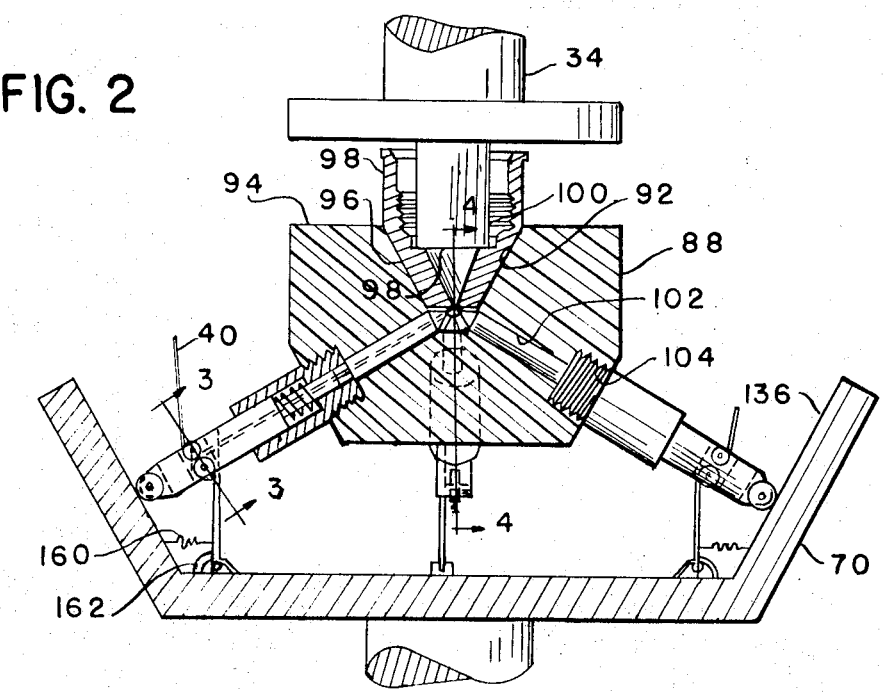
FIG. 2
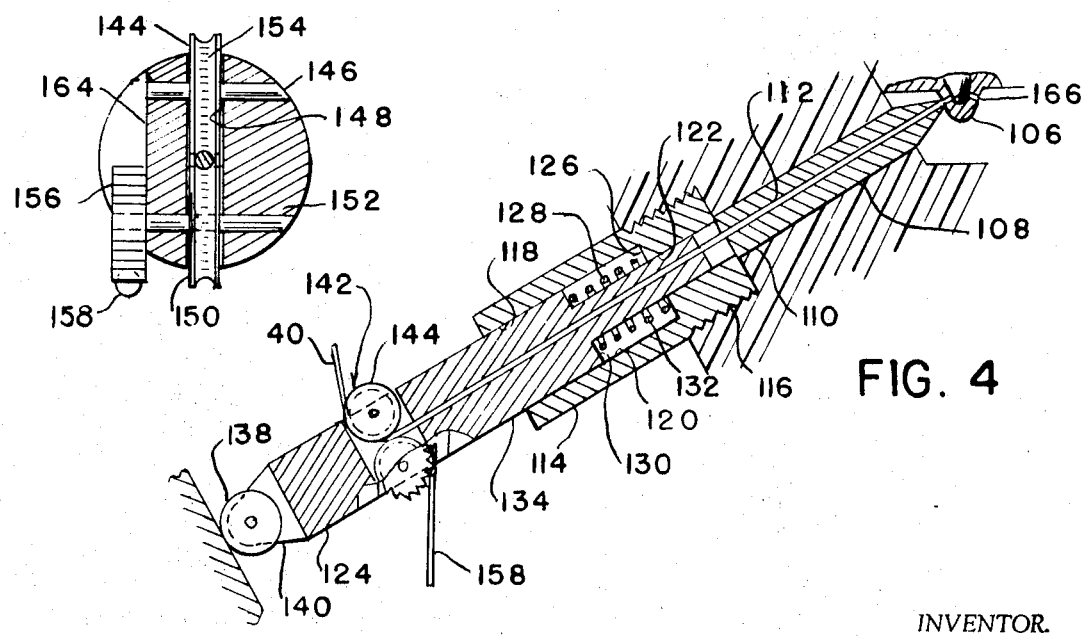
FIG. 3
FIG. 4
INVENTOR.
RONALD G. BURNET
BY ROBERT L. SIMPKINS
ATTORNEYS

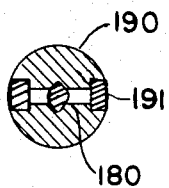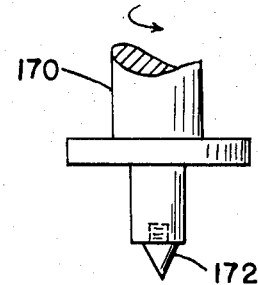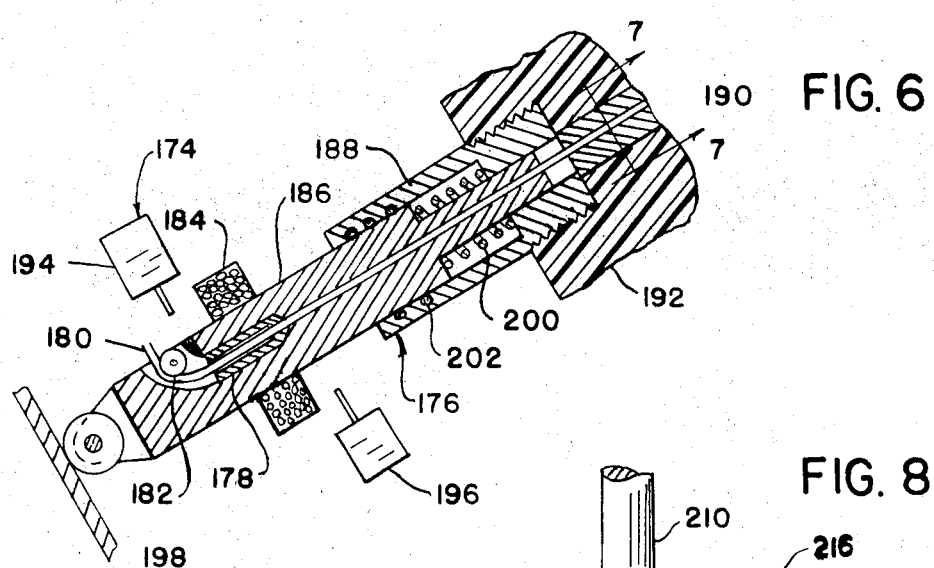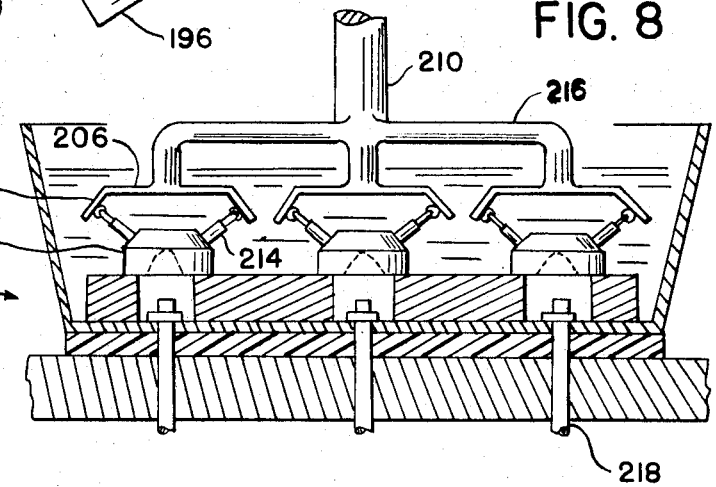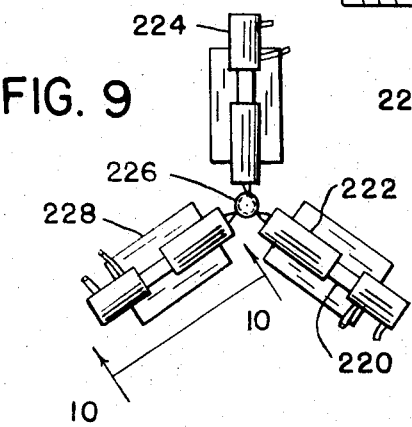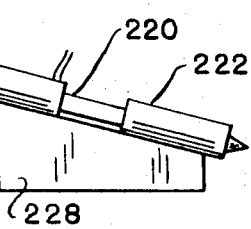
INVENTOR.S
RONALD G. BURNET
ROBERT L. SIMPKINS
BY
ATTORNEYS United States Patent Office
3,538,289
Patented Nov. 3, 1970

ABSTRACT OF THE DISCLOSURE

Structure for machining small diameter openings in a fuel nozzle or the like wherein the openings diverge radially comprising means for supporting a plurality of wire electrodes adjacent a workpiece in radially converging positions including guide means for moving the electrodes radially toward the workpiece on movement of a single camming structure axially of the workpiece and means for providing electric energy between the electrodes and workpiece and for maintaining a predetermined space between the electrodes and workpiece on movement of the camming structure axially of the workpiece. Means are provided in conjunction with the guide means for indexing the wire electrodes after each machining operation.

---

A plurality of such structures operable simultaneously is disclosed together with means for securing the workpiece in a predetermined position relative to the guide means. Means for dressing the electrodes after each machining operation is included as part of the invention along with the method of electrical machining performed by the particularly disclosed structure.

In the past small diameter fuel outlet openings in fuel injection nozzles have been made with the usual metal-to-metal cutting drills of small diameter. The drills which may be a few thousandths of an inch thick are expensive and subject to high breakage and deterioration in use. Further drilled openings may have burrs or other irregularities therein so that a separate finishing operation is usually required. Thus the production of fuel injection nozzles in the past has been relatively expensive.

It is therefore an object of the present invention to provide improved apparatus for machining small diameter diverging openings in fuel injection nozzles and the like.

Another object is to provide an improved method of machining small diameter diverging openings through fuel injection nozzles.

Another object is to provide apparatus for making small diameter diverging openings in a fuel injection nozzle tip or the like comprising means for supporting a fuel injection nozzle in a predetermined fixed position, a wire electrode, electrode guide means for guiding the electrode toward the fuel injection nozzle, a source of electric energy connected across the fuel injection nozzle and electrode whereby the nozzle is eroded on movement of the electrode into close proximity thereto, reciprocally movable ram structure engageable with the guiding means for movement thereof toward the workpiece on movement of the ram structure in one direction, and means for moving said ram structure in said one direction in accordance with the gap between the nozzle and electrode.

Another object is to provide apparatus as set forth above wherein the electrode guide means includes a guide member positioned adjacent the nozzle, a cylinder member positioned axially of the guide member, a piston member reciprocally mounted in the cylinder member, and means for feeding a wire electrode axially through the piston member, cylinder member and guide member toward and away from the nozzle.

Another object is to provide apparatus as set forth above wherein recirculating bearings are provided operable between the piston member and cylinder member.

Another object is to provide apparatus as set forth above including means for indexing the electrode during each cycle of operation thereof.

Another object is to provide structure as set forth above wherein the means for indexing the electrode during each cycle of operation comprises pawl and ratchet means.

Another object is to provide apparatus as set forth above wherein the means for indexing the electrode during each cycle of operation comprises a magnetic chuck and a pair of limit switches operably associated therewith and defining the limit of indexing of the electrode.

Another object is to provide apparatus as set forth above wherein a plurality of the electrode guide means are operable in conjunction with a single ram structure to produce a plurality of small diameter openings through a single nozzle.

Another object is to provide apparatus as set forth above wherein a plurality of ram structures are operable to produce a plurality of openings in a plurality of nozzles simultaneously.

Another object is to provide structure as set forth above wherein the guide member is split longitudinally.

Another object is to provide structure as set forth above and further including plunger means for seating the nozzle in a predetermined position.

Another object is to provide structure as set forth above wherein the plunger means is an electric conductor and is rotatable for dressing the electrode ends.

Another object is to provide a plurality of guide means as set forth above which are separately driven and are individually mounted at predetermined spaced apart, radially divergent and axially inclined locations.

Another object is to provide a method of producing small diameter diverging openings in fuel injection nozzles or the like comprising exactly positioning the nozzles, connecting one terminal of a source of electric energy to wire electrodes supported on converging electrode guides and the other end of the source of electric energy to the nozzle, and moving the electrode guides toward the nozzle in a radially and axially converging path to maintain a predetermined gap therebetween in response to the electrical signal therebetween.

Another object is to provide a method as set forth above and further including indexing the electrodes a predetermined amount after openings have been machined in a nozzle.

Another object is to provide a method as set forth above and further including dressing the electrodes after a machining operation.

Another object is to provide apparatus for and a method of electric machining of small diameter diverging openings in a fuel injection nozzle or the like which is simple, economical and efficient.

Other objects and features of the invention will become apparent as the description proceeds, especially when taken in conjunction with the accompanying drawings, illustrating a preferred embodiment of the invention, wherein:

FIG. 2 is an enlarged partial section view of the apparatus illustrated in FIG. 1 taken substantially on the line 2—2 in FIG. 1.

FIG. 3 is an enlarged cross section of the strucutre illustrated in FIG. 2 taken substantially on the line 3—3 in FIG. 2.

FIG. 4 is an enlarged longitudinal section view of a portion of the apparatus illustrated in FIG. 2 taken substantially on the line 4—4 in FIG. 2.

FIG. 5 is an elevation view of modified ram structure for use in apparatus as illustrated in FIG. 1.

FIG. 6 is a longitudinal section view of modified electrode guide means for use in electric machining apparatus as illustrated in FIG. 1.

FIG. 7 is a cross section of the guide member of the electrode guide means illustrated in FIG. 6 taken on the line 7—7 in FIG. 6.

FIG. 8 is a partial section view of modified apparatus for machining small diameter diverging openings in fuel injection nozzles or the like constructed in accordance with the invention.

FIG. 9 is a plan view of another modification of the electric machining apparatus illustrated in FIG. 1.

FIG. 10 is an elevation view of a portion of the modified electric machining apparatus illustrated in FIG. 9 taken substantially on the line 10—10 in FIG. 9.

Figure 1:
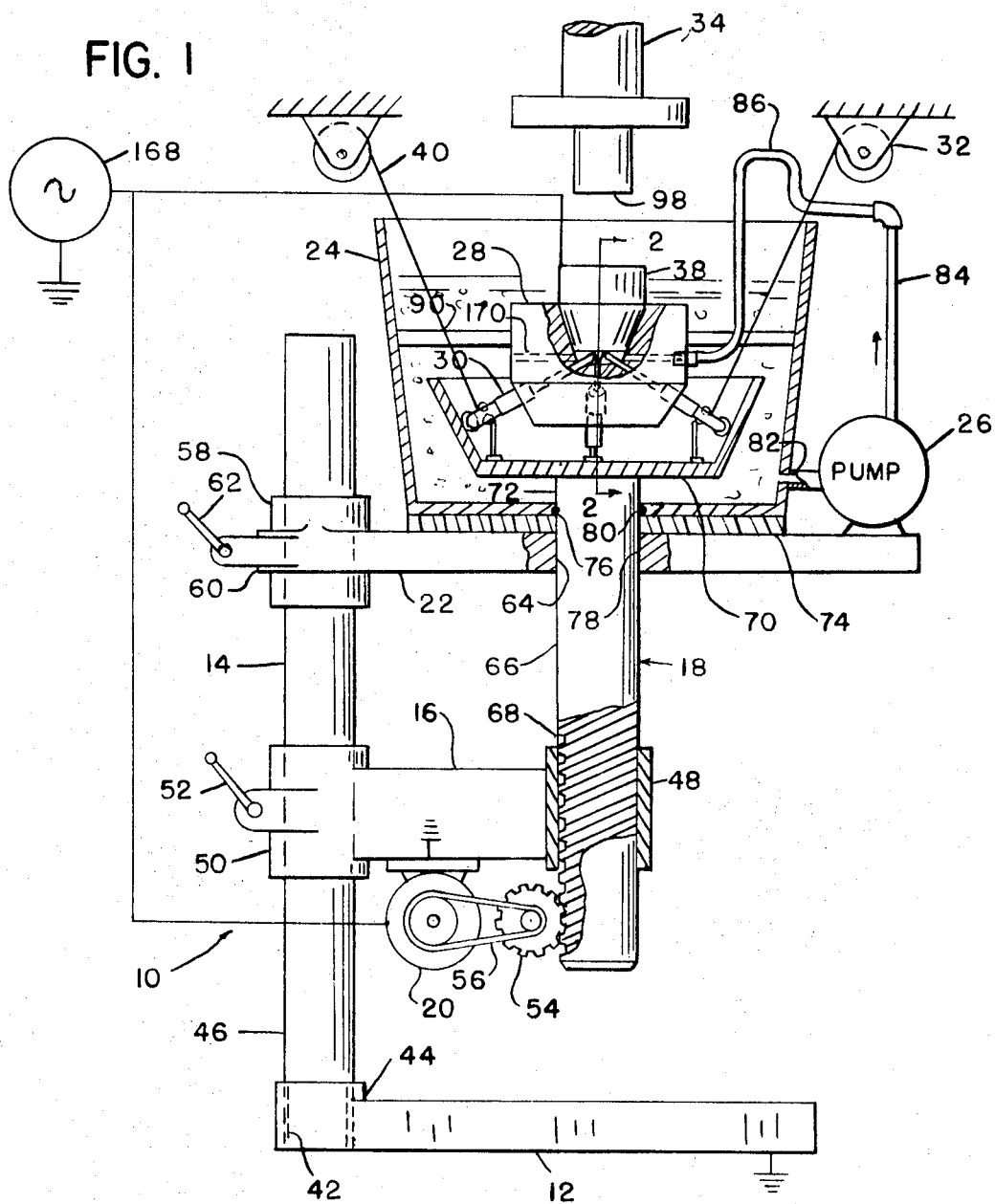
FIG. 1 is an elevation view, partly broken away, of apparatus for machining small diameter spaced apart, diverging and inclined openings in fuel injection nozzles or the like constructed in accordance with the invention.

With particular reference to the figures of the drawings, one embodiment of the present invention will now be considered in detail.

The electric discharge machining apparatus 10 illustrated in FIG. 1 includes the base 12 having column 14 secured thereto on which the arm 16 for adjustably supporting the ram structure 18 and servo motor 20 and the platform 22 on which the dielectric tank 24 and pump 26 are supported are adjustably mounted. The source of pulsating electric energy 36 connected, as shown best in FIG. 1, is also included in the electric discharge machining apparatus 10.

The electric discharge machining apparatus 10 further includes the work supporting fixture 28 having the electrode guide means 30 secured therein positioned within the dielectric tank 24, as shown best in FIG. 1. The electrode indexing structure 32 carried by and operable between the electrode guide means 30 and ram structure 18 and the workpiece positioning apparatus 34 positioned above the work supporting fixture 28 are also part of the electric discharge machining apparatus 10.

In operation, when it is desired to machine fine angularly spaced apart radially diverging and axially inclined openings through a fuel injection nozzle 38, the nozzle 38 is placed in work holding fixture 28 and is held in a predetermined position therein by plunger 34, after which the ram structure 18 is advanced toward the fixture 28 to contact the electrode guide means 30 and moves the wire electrodes 40 toward the nozzle 38 in accordance with the energization of servo motor 20 controlled by the electric signal across the gap between the electrodes 40 and the nozzle 38 in the usual manner. Dielectric fluid may be pumped through the fixture 28 during machining by means of pump 26.

More specifically, as shown in FIG. 1, the base 12 of electric discharge machining apparatus 10 is a heavy metal casting which may have any desired shape. The base 12 includes the threaded opening 42 extending through the boss 44 thereon. Column 14 which extends perpendicularly to base 12 is secured in the opening 42 at the threaded end 46 thereof. Alternatively the column 14 may be permanently secured to the base 12 by convenient means, such as welding.

Arm 16 includes the sleeves 48 and 50 at opposite ends thereof. Sleeve 50 is positioned over column 14 for sliding movement therealong and may be fixed in a predetermined adjusted position by locking means 52. The ram structure 18 of the electric machining apparatus 10 is reciprocally mounted in sleeve 48 on arm 16.

Servo motor 20 is secured to the arm 16 for movement therewith. Servo motor 20 is connected to ram 18 by means of the pinion 54 and endless drive belt 56.

Platform 22 is provided with sleeve 58 at end 60 thereof. Platform 22 may be locked in a vertically adjusted position on the column 14 by locking means 62. Opening 64 in platform 22 is provided to permit vertical reciprocation of the ram structure 18.

The ram structure 18 includes the vertically reciprocal shaft 66 extending through the opening 64 in platform 22. Shaft 66 is provided with rack means 68 on one side thereof in mesh with the pinion 54 whereby the shaft 66 may be driven in accordance with the energization of the reversible servo motor 20, as will be considered subsequently. The dish-shaped cam member 70 is secured to the end 72 of shaft 66 for movement therewith.

As shown, the dielectric tank 24 is mounted on the insulating pad 74 on platform 22. The tank 24 and pad 74 are provided with openings 76 and 78, respectively, extending therethrough through which the shaft 66 passes. An annular seal 80 prevents leakage of dielectric fluid from the tank around the shaft 66.

Dielectric fluid is pumped through the passages 82 and 84 and recess 92 in the work holding fixture 28 from tank 24 through dielectric conduit 82, pump 26, dielectric conduit 84 and flexible conduit 86, respectively.

The work holding fixture 28 includes the body member 88 of material which is an electric insulator, such as most plastics and is supported within the tank 24 in a predetermined position by brackets 90. The body member 88 is provided with a recess 92 in surface 94 thereof tapered to receive the tapered portion 96 of the fuel injection nozzle 38 in a predetermined position. The fuel injection nozzle 38 is thus exactly located in the work holding fixture 28 in a repeatable position for different workpieces having the same tapered surface 96.

Plunger means 34 includes a work engaging end 98 and is provided to secure the workpiece 38 in position in the work holding fixture 28 in an exact location with the end 98 thereof engaged with the annular land 100 provided in the workpiece 38, as shown best in FIG. 2.

The body member 88 is further provided with a plurality of angularly spaced axially inclined openings 102 extending therethrough which converge toward the tip 106 of nozzle 38 as shown best in FIG. 2. Openings 102 are tapered radially inwardly toward recess 92 and are provided with the threaded, radially enlarged portion 104 at the other end thereof.

Separate electrode guide means 30 are secured in each of the openings 102 to guide the electrode wire 40 toward the tip 106 of the fuel injection nozzle 38 in which it is desired to produce a plurality of angularly spaced, axially inclined small diameter openings which diverge outwardly of the nozzle, as shown best in FIG. 4.

Each of the guide means 30 includes a guide member 108 which tapers radially outwardly toward end 110 thereof and has the opening 112 extending axially therethrough. Guide members 108 are positioned in the openings 102 and are held in the tapered openings 102 by the cylinder member 114 secured in the threaded portion 104 of the opening 102 by means of threads 116 thereon. Guide members 108 are provided to guide the wire electrode 40 toward the tip 106 of fuel injection nozzle 38 and straighten the electrode 40 if necessary while maintaining the electrode rigid to within a few ten-thousandths of an inch of the tip 106 of fuel injection nozzle 38.

The cylinder members 114, as previously indicated are threaded into the threaded portions 104 of the openings 102 and include an axial opening 118 extending therethrough having the larger diameter portion 120 and the smaller diameter portion 122, respectively. Cylinder members 114 are provided to guide the piston members 124 in reciprocal movement toward and away from the fuel injection nozzle tip 106. The different diameter portions 120 and 122 of the cylinder members 114 provide an annular surface 126 against which one end of springs 128 abut.

Springs 128 are operable between the annular surface 126 on the cylinder members 114 and a similar annular surface 130 on the piston members 124 to urge the piston members 124 out of the cylinder members 114, as shown best in FIG. 4.

The piston members 124, as shown best in FIG. 4, are provided with a small diameter inner portion 132 reciprocal in the small diameter portion 122 of the cylinder members 114 and are provided with larger diameter portion 134 reciprocal in the larger diameter portion 120 of cylinder members 114. Piston members 124 are thus moved toward the fuel injection nozzle 38 on movement of the dish-shaped member 70 of head structure 18 toward the work holding fixture 28 so that the tapered sides 136 of the dish-shaped member 70 engages the roller 138 secured to the bifurcated end 140 of each of the piston members 124.

The piston members 124 also support part of the indexing mechanisms 142 for the wire electrodes 40. The indexing mechanism 142 includes an idler wheel 144 rotatably mounted on pin 146 extending across slot 148 in the piston members 124, as shown best in FIG. 3, and the driven wheel 150 secured to shaft 152 for rotation therewith. The wheels 144 and 150 are formed on their outer periphery and are provided with gripping knurls 154 on the formed outer periphery so that a wire electrode 40 is indexed between the wheels 144 and 150 on rotation of the shaft 152.

Shaft 152 is rotated on indexing of the ratchet wheel 156. Each ratchet wheel 156 is indexed by a separate pawl 158 pivoted to the dish-shaped member 70 of ram structure 18 in alignment with a corresponding ratchet wheel 1566. Pawls 158 are urged by spring 160 against stops 162 secured to the dish-shaped member 70 to limit movement of pawls 158 in one direction.

Thus in operation each time the dish-shaped cam member 70 of ram structure 18 moves into contact with the rollers 138 on piston members 124, the pawls 158 are cammed over the ratchet wheels 156 into recesses 164 in which the ratchet wheels 156 are mounted. After openings 166 have been machined through the tip 106 of one fuel injection nozzle 38 the ram structure 18 is withdrawn. At this time the pawls 158 will engage the ratchet wheels 156 to index the wire electrodes 40 a predetermined amount toward the nozzle 38 to make up for that portion of the electrode 40 which has been eroded away during the machining of the openings 166 in the tip 106 of nozzle 38.

In over-all operation, with the ram structure 18 in a lowered position so that the dish-shaped cam member 70 is out of contact with the rollers 138, a fuel injection nozzle 38 is positioned in a work holding fixture 28 accurately located in dielectric tank 24 with the surface of the nozzle 38 in engagement with the surface 92 of the insulating body member 88. The plunger means 34 is then placed in contact with the nozzle 38 to hold the nozzle 38 in an exact predetermined position with respect to the work holding fixture 28.

Ram structure 18 is then moved upwardly so that the dish-shaped cam member 70 contacts rollers 138 and causes the piston members 124 to proceed inwardly of the cylinder members 114. The wire electrodes 40 which may be tungsten or molybdenum wire of extremely small diameter having a desired cross section such as an oval cross section, which have previously been indexed will thus be moved through the guide members 108 and into contact with the tip 106 of nozzle 38.

Due to the usual electric discharge machining operation an exactly positioned, extremely small diameter opening which is free of burrs is thus machined in the nozzle 38. The rate of cutting is of course determined by the actuation of the servo motor 20 which is connected in parallel with the workpiece and the electrode across the source of pulsating unidirectional electric energy 168 in the usual manner, as shown best in FIG. 1.

During machining of the openings 166 through the nozzle tip 106 dielectric fluid is passed through the recess 92 in the insulating body member 88 of the work holding fixtures through the passages 83 and 85 positioned angularly between the guide means 30 about the work holding fixture 28 by means of the pump 26 and the associated conduits 82, 84 and flexible hose 86.

After the openings 166 have been machined in the nozzle tip 106, the ram structure 18 is withdrawn to withdraw the electrode wires 40 from the finished fuel injection nozzle 38. On withdrawal of the ram structure 18 the pawl members 158 engage the ratchet wheels 156 to index the ratchet wheels and thus the electrode wires 40 a short distance axially inwardly of the guide member 108 to exactly make up the dimension of the electrode wire 40 which has been eroded during the machining operation.

The positioning apparatus 34 is then raised and the finished nozzle 38 is withdrawn from the recess 92.

This process may be repeated indefinitely to produce nozzle 38 with very small diameter, radially diverging, axially inclined and angularly spaced openings 166 in the tips thereof which are exactly located and which are burr free.

It will be evident from consideration of the apparatus illustrated in FIGS. 1–4 that the apparatus lends itself equally well to electro-chemical machining of the openings 166 through the tips 106. Further, the number of openings in the nozzle tips 106 may be varied. The size and location of the openings may be similarly varied. Such modifications in nozzles 38 require only the resizing of the opening through the guide member 108 and piston member 134 and the repositioning of the electrode guide structure 30 in the work holding fixture 28 together with similar repositioning of the pawl members 158.

As shown in FIG. 5, if the electrodes 40 wear unevenly during a machining operation or if due to accumulative error in the indexing mechanism 142 it becomes desirable to dress the ends of the wire electrode 40 to provide a predetermined length of electrode before the starting of a machining operation, modified plunger means 170 which is provided with a removable conical tip 172 and which is rotatable may be provided. Thus after removal of a nozzle workpiece from the machining apparatus 10 the plunger means 170 may be rotated and brought into the work holding fixture 28 so that the conical tip 172 will engage the electrodes to dress them to a predetermined equal length. The dressing of the electrodes 40 could also be accomplished by providing a dummy rotating nozzle during a machining operation.

The magnetic indexing means 174 illustrated in FIG. 6 shown in conjunction with modified guide means 176 includes the magnetic chuck 178 operable to grip a wire electrode 180 which is fed around roller 182 on energization of the actuating solenoid 184 thereof. Solenoid 184 is secured to the piston member 186 reciprocally mounted in the cylinder member 188 which holds the guide member 190 in the insulating block 192 as before. The limit switches 194 and 196 are provided in conjunction with the magnetic chuck solenoid 184 and are operable in the energizing circuit (not shown) for the solenoid 184 to cause the solenoid 184 to always be energized on movement of the piston structure 186 inwardly of the cylinder member 188 and to deenergize the solenoid structure 184 only on movement of the solenoid structure 184 out of the cylinder member 188 a predetermined distance.

Thus in operation, as the piston member 186 starts into the cylinder member 188 the solenoid structure 184 is energized so that the chuck 178 firmly grips the electrode 180 and moves it toward the workpiece with the piston member 186. After the machining operation is completed as the cam member 198 is withdrawn by electric machining head structure as before, and the piston member 186 moves out of the cylinder member 188 under urging of the biasing spring 200, the switch 196 is opened so that the solenoid 184 is deenergized. During the remainder of the moving of the piston member out of the cylinder member the electrode is not withdrawn with the piston member.

The modified guide means 176 also includes recirculating bearings 202 between the piston member 186 and the cylinder member 188 to reduce the wear therebetween.

Further the guide member 190, as best shown in FIG. 7, is split longitudinally whereby the same guide member in conjunction with spacers 191 may be used with electrodes 180 having different cross sections.

The modified electric machining apparatus 204 illustrated in FIG. 8 includes a plurality of cam members 206, the sides 208 of which are parallel, which are supported by a shaft 210 for reciprocating movement with respect to the workpiece supporting structures 212 and guide means 214. Also, it will be noted that the shaft 210 is positioned for downward movement during a machining operation rather than an upward movement so that the workpiece supporting structures 212 and the ram means 218 are similarly reversed in position.

The modification of the invention illustrated in FIGS. 9 and 10 comprises a plurality of individual guide means 220 positioned for separate mounting in different positions in housings 222 on insulating blocks 228 for actuation by separate hydraulic means 224. The electric machining structure of FIGS. 9 and 10 is particularly versatile in that the same guide structure may be used for providing openings at different angles and in different positions about a workpiece 226.

While one embodiment of the present invention has been disclosed in detail and modifications suggested, it will be understood that other embodiments and modifications of the invention are contemplated. It is the intention to include all embodiments and modifications as are defined by the appended claims within the scope of the invention.

What we claim as our invention is:

1. Electric machining apparatus comprising a source of electric energy, a cylindrical workpiece connected to one side of the source of electric energy, means for supporting the workpiece in a predetermined position, a servo motor connected to the same side of the source of electric energy, ram structure connected to the other side of the source of electric energy and movable in response to said servo motor toward and away from said workpiece held in said predetermined position, at least one wire electrode, and means for feeding the wire electrode radially of the workpiece in response to movement of the ram structure axially of the workpiece and means for automatically indexing the electrode toward the workpiece to compensate for electrode wear during each machining operation in response to movement of the ram structure axially of the workpiece.

2. Structure as set forth in claim 1 and further including means for passing a dielectric between the electrode and the workpiece during operation of the electric machining apparatus.

3. Structure as set forth in claim 1 and including a plurality of wire electrodes and separate means for feeding each of the wire electrodes radially of the workpiece on movement of said ram structure angularly npaced about the workpiece.

4. Electric discharge machining apparatus comprising a source of unidirectional pulsating electric energy, a servo motor connected to said source of electric energy for actuation in opposite directions in accordance with the signal thereacross, ram structure connected to the servo motor for reciprocal movement in accordance with the actuation of the servo motor, a cylindrical workpiece connected to one terminal of the source of electric energy, means for supporting the workpiece in a predetermined position, means for holding the workpiece in the predetermined position, a wire electrode connected to the other terminal of the source of electric energy, and cam and guide means for moving the wire electrode radially toward and away from the workpiece in the predetermined position in response to movement of the ram structure axially of the workpiece and means operably associated with the means for moving the electrode with respect to the workpiece for indexing the electrode toward the workpiece after each machining operation.

5. Structure as set forth in claim 4 and further including means operably associated with the electrode and workpiece for pumping dielectric through the gap between the electrode and workpiece.

6. Structure as set forth in claim 4 wherein the cam and guide means for moving the electrode radially comprises a guide member through which the wire electrode passes in immediate proximity to said workpiece, a cylinder member positioned axially of the guide, a piston member received in said cylinder member including means for feeding a wire electrode axially thereof into said guide member, means urging the piston out of the cylinder member, and a cam surface on said ram structure operable to move the piston structure into the cylinder on movement of the ram structure axially of the workpiece.

7. Structure as set forth in claim 6 wherein the guide member is split longitudinally.

8. Structure as set forth in claim 6 and further including drive wheels on said piston member through which said wire electrode is passed and means for indexing the wire electrode through said wheels on said piston member after each machining operation.

9. Structure as set forth in claim 4 and further including a plurality of cam and guide means for moving a plurality of wire electrodes positioned angularly about the workpiece converging radially toward the workpiece and inclined axially with respect thereto, whereby a plurality of small diameter, radially diverging, axially inclined and angularly spaced openings may be machined in said workpiece simultaneously.

10. Structure as set forth in claim 9 and further including means for separately positioning and moving the cam and guide means.

11. The method of machining small diameter openings in fuel injection nozzles comprising positioning a fuel injection nozzle in a predetermined position relative to angularly spaced radially diverging and axially inclined electrode guide means, advancing electric machining ram structure including a cam surface toward the fuel injection nozzle and into contact with the electrode guide means to feed the electrode guide means toward the nozzle, providing a unidirectional pulsating electric signal between wire electrodes held in the electrode guide means and the nozzle while maintaining a predetermined spacing therebetween, and automatically indexing the electrodes through the electrode guide means after each machining operation.

12. The method as set forth in claim 11 and further including flushing a dielectric through the gap between the electrode and workpiece during a machining operation.

13. Electric discharge machining apparatus comprising a source of unidirectional pulsating electric energy, a servo motor connected to said source of electric energy for actuation in opposite directions in accordance with the signal thereacross, ram structure connected to the servo motor for reciprocal movement in accordance with the actuation of the servo motor, a cylindrical workpiece connected to one terminal of the source of electric energy, means for supporting the workpiece in a predetermined position, means for holding the workpiece in the predetermined position, wire electrodes connected to the other terminal of the source of electric energy and a plurality of guide means and single cam means engageable with the guide means for moving the wire electrodes radially toward and away from the workpiece in the predetermined position in response to movement of the ram structure axially of the workpiece, each of the guide means comprising a guide member through which a wire electrode passes in immediate proximity to said fuel injection nozzle, a cylinder member positioned axially of the guide means, a piston member received in said cylinder member having means for feeding the electrode axially thereof into said guide member, including drive wheels on said piston member through which said wire electrode is passed and means for indexing the wire electrode through said wheels on said piston member after each machining operation, comprising a ratchet wheel secured to one of the drive wheels for rotation therewith and pawl means secured to said ram structure for indexing of said ratchet wheel on movement of the ram structure relative to the workpiece means urging the piston member out of the cylinder member, the single cam means comprising a cam surface on said ram structure operable to move the piston member into the cylinder member on movement of ram structure axially of the workpiece.

14. Electric discharge machining apparatus comprising a source of unidirectional pulsating electric energy, a servo motor connected to said source of electric energy for actuation in opposite directions in accordance with the signal thereacross, ram structure connected to the servo motor for reciprocal movement in accordance with the actuation of the servo motor, a cylindrical workpiece connected to one terminal of the source of electric energy, means for supporting the workpiece in a predetermined position, means for holding the workpiece in the predetermined position, wire electrodes connected to the other terminal of the source of electric energy and a plurality of guide means and single cam means engageable with the guide means for moving the wire electrodes radially toward and away from the workpiece in the predetermined position in response to movement of the ram structure axially of the workpiece, each of the guide means comprising a guide member through which a wire electrode passes in immediate proximity to said fuel injection nozzle, a cylinder member positioned axially of the guide means, a piston member received in said cylinder member having means for feeding the electrode axially thereof into said guide member including magnetic means operably associated with the guide mean for indexing the electrode toward the workpiece after each machining operation including a magnetic chuck in said piston member, a solenoid carried by said piston member for causing said chuck to grip said electrode only on energization thereof and a pair of switches for selectively energizing said solenoid in accordance with the position of said piston, means urging the piston member out of the cylinder member, the single cam means comprising a cam surface on said ram structure operable to move the piston member into the cylinder member on movement of the ram structure axially of the workpiece.

References Cited

UNITED STATES PATENTS

| | | | |
|---|---|---|---|
| 247,137 | 9/1881 | Walters | 77—26 |
| 1,307,897 | 6/1919 | Curtis | 77—26 |
| 2,965,745 | 12/1960 | Hardy et al. | 219—127 |
| 2,778,925 | 1/1957 | Gross et al. | 219—69 |
| 3,098,148 | 7/1963 | Piot et al. | 219—69 |
| 3,122,628 | 2/1964 | Inoue | 219—69 |

RALPH F. STAUBLY, Primary Examiner

U.S. Cl. X.R.

77—26